United States Patent
Schulz et al.

(10) Patent No.: US 11,423,778 B2
(45) Date of Patent: Aug. 23, 2022

(54) DEVICE AND METHOD FOR CONTROLLING THE OUTPUT OF DRIVER INFORMATION AND FOR MAINTAINING THE ATTENTION OF A DRIVER OF AN AUTOMATED VEHICLE

(71) Applicant: Robert Bosch GmbH, Stuttgart (DE)

(72) Inventors: Michael Schulz, Sinsheim (DE); Jihad Miramo, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/291,383

(22) PCT Filed: Oct. 1, 2019

(86) PCT No.: PCT/EP2019/076581
§ 371 (c)(1),
(2) Date: May 5, 2021

(87) PCT Pub. No.: WO2020/126143
PCT Pub. Date: Jun. 25, 2020

(65) Prior Publication Data
US 2022/0005349 A1 Jan. 6, 2022

(30) Foreign Application Priority Data
Dec. 20, 2018 (DE) .......................... 102018222378.5

(51) Int. Cl.
*G08G 1/123* (2006.01)
*G08G 1/0962* (2006.01)
(Continued)

(52) U.S. Cl.
CPC ......... *G08G 1/09626* (2013.01); *B60K 35/00* (2013.01); *B60R 16/0373* (2013.01);
(Continued)

(58) Field of Classification Search
CPC .. G08G 1/09626; G08G 1/0962; B60K 35/00; B60K 2370/148; B60K 2370/164;
(Continued)

(56) References Cited

U.S. PATENT DOCUMENTS 7,133,775 B2 * 11/2006 Adamski .......... G08G 1/096894
701/438
2003/0191578 A1 * 10/2003 Paulauskas ........ G01C 21/3682
701/438
(Continued)

FOREIGN PATENT DOCUMENTS

DE 102007030243 A1 1/2009
DE 102010013402 A1 11/2010
(Continued)

OTHER PUBLICATIONS

International Search Report for PCT/EP2019/076581, dated Feb. 26, 2020.

*Primary Examiner* — Anh V La
(74) *Attorney, Agent, or Firm* — Norton Rose Fulbright US LLP; Gerard Messina (57) ABSTRACT

An apparatus and a method for controlling the output of driver information to a driver of a vehicle, with the objective of entertaining the driver and/or the passengers of the vehicle and/or increasing the driver attentiveness of the driver. A database of points of interest or objects of general interest, a database of topographic information, a device for determining the whereabouts of the vehicle, and an evaluation device to which these information items are delivered, are provided. The evaluation device ascertains, from the current whereabouts of the vehicle and from the topographic information, which points of interest or objects of general interest are present in the driver's field of view, and outputs via an output device the driver information regarding the
(Continued)

point of interest or the object of general interest which has been ascertained by the evaluation device to be located in the driver's field of view.

10 Claims, 3 Drawing Sheets (51) Int. Cl.
*H04W 4/029* (2018.01)
*B60K 35/00* (2006.01)
*B60R 16/037* (2006.01)
*G01C 21/34* (2006.01)
*H04W 4/021* (2018.01)
*G06F 3/01* (2006.01)
*G06F 3/16* (2006.01)

(52) U.S. Cl.
CPC ........ *G01C 21/3476* (2013.01); *H04W 4/021* (2013.01); *H04W 4/029* (2018.02); *B60K 2370/148* (2019.05); *B60K 2370/164* (2019.05); *B60K 2370/165* (2019.05); *B60K 2370/166* (2019.05); *G06F 3/013* (2013.01); *G06F 3/017* (2013.01); *G06F 3/167* (2013.01)

(58) Field of Classification Search
CPC ........ B60K 2370/165; B60K 2370/166; B60K 2370/566; B60K 2370/595; B60K 28/066; B60K 2370/152; B60K 2370/1575; B60K 2370/194; B60R 16/0373; G01C 21/3476; H04W 4/021; H04W 4/029; G06F 3/013; G06F 3/017; G06F 3/167; G06V 20/597; B60W 2540/223; B60W 2050/143; B60W 2050/146; B60W 2540/00; B60W 2540/225; B60W 2540/229; B60W 2552/20; B60W 2555/00; B60W 2556/50; B60W 50/14; B60W 40/02; B60W 40/08; B60W 60/0013; B60W 2040/089; B60W 2420/42; G06K 9/6289
USPC ............ 340/995.24, 995.1, 988, 990, 995.17
See application file for complete search history.

(56) References Cited

U.S. PATENT DOCUMENTS

| | | | |
|---|---|---|---|
| 2008/0291032 | A1 | 11/2008 | Prokhorov et al. |
| 2013/0076883 | A1 | 3/2013 | Madau et al. |
| 2014/0142842 | A1* | 5/2014 | Knobel ............... G01C 21/3682 701/410 |
| 2014/0274107 | A1* | 9/2014 | Rados ................ G01C 21/3682 705/14.66 |
| 2016/0272215 | A1* | 9/2016 | Laine .................... B60W 40/09 |
| 2019/0043088 | A1* | 2/2019 | Garcia ............... G06Q 30/0226 |

FOREIGN PATENT DOCUMENTS

| | | |
|---|---|---|
| DE | 102010038454 A1 | 2/2012 |
| DE | 102013212186 A1 | 12/2014 |
| DE | 102014225383 A1 | 6/2016 |
| DE | 102015015510 A1 | 6/2017 |
| DE | 102016208405 A1 | 6/2017 |
| DE | 112016004391 T5 | 6/2018 |
| DE | 102018004121 A1 | 11/2018 |
| EP | 3244591 A1 | 11/2017 |
| WO | 2015062750 A1 | 5/2015 |

* cited by examiner

DEVICE AND METHOD FOR CONTROLLING THE OUTPUT OF DRIVER INFORMATION AND FOR MAINTAINING THE ATTENTION OF A DRIVER OF AN AUTOMATED VEHICLE

The present invention relates to an apparatus and a method for controlling the output of driver information to a driver of a vehicle, with the objective of entertaining the driver and/or the passengers of the vehicle and/or increasing the driver attentiveness of the driver. For that purpose, a database of points of interest or objects of general interest is provided, a database of topographic information is provided, a device for determining the whereabouts of the vehicle is provided, and an evaluation device to which these information items are delivered is provided. This evaluation device ascertains, from the current whereabouts of the vehicle and from the topographic information, which points of interest or objects of general interest are present in the driver's field of view, and outputs via an output device the driver information regarding the point of interest or the object of general interest which has been ascertained by the evaluation device to be located in the driver's field of view.

BACKGROUND INFORMATION

German Patent Application No. DE 10 2013 212 186 A1 describes a device in a vehicle for acquiring, with a camera, at least one image of at least one object located outside the vehicle, this device encompassing a position determination device for determining the position of the camera, having a memory containing a terrain model that encompasses positional information of the at least one object to be imaged and a landscape model of an intermediate position of the camera and object-related landscape; having a determination device for determining, from the position of the camera, from the positional information of the object to be imaged, and from the landscape model, a visual connection between the camera and the object to be imaged; and having a control system that is embodied to apply control to the camera in order to acquire an image or an image sequence when the presence of a visual connection between the camera and the object to be imaged is identified by the determination device; as well as a method for acquiring images, by which the automatic acquisition of images of so-called POIs is enabled as they are passed by in the context of a journey with a vehicle.

SUMMARY

In accordance with the present invention, an apparatus and a method are provided for controlling the output of driver information that entertains the driver as necessary or enhances the driver's driver attentiveness as necessary, by the fact that information regarding points of interest or objects of general interest in the driver's field of view is outputted. This can occur by output of a request signal.

According to the present invention, this is achieved in accordance with example embodiments. Advantageous refinements and embodiments are evident from the disclosure herein.

In accordance with an example embodiment of the present invention, the request signal can be outputted by detection of a driver-initiated action, for example by way of a longer-dwelling driver gaze or a driver gesture; or the request signal can be outputted by a monitoring system that, in a specific situation, recognizes triggering conditions as being met, for example by the fact that a driver monitoring system recognizes driver fatigue and outputs a request signal.

Advantageously, in accordance with an example embodiment of the present invention, provision is made that in addition, a device for monitoring the driver is provided, by way of which the current gaze direction of the driver and/or the driver's facial expression and/or the driver's gestures and/or the pointing direction of a finger or hand or arm of the driver and/or a device for voice recognition and/or an actuation of an operating device by the driver is detected, and the driver's current field of view is determined. The "field of view" is the region that the driver is currently observing. The viewing region can also be defined as a "region of interest," i.e., as a region around a point of interest having a predetermined spatial extent. It is particularly advantageous to use for this purpose a driver observation camera, for example an interior camera, which can detect the driver's attentiveness with regard to current driving events and can recognize the driver's gestures or facial expressions and gaze direction and make them available to the evaluation device.

It is further advantageous in the context of the method according to an example embodiment of the present invention that the evaluation device additionally has delivered to it data of a device for monitoring the driver, in particular that data of a driver gaze direction recognition system and/or data of a driver facial expression recognition system and/or data of a driver gesture recognition system and/or data of a system for recognizing the pointing direction of a finger of the driver and/or data of a voice recognition device and/or data of a driver-actuatable operating device are delivered to the evaluation device, and the driver's current field of view is determined therefrom.

In accordance with an example embodiment of the present invention, it is furthermore advantageous that an environment sensor is provided on the vehicle, and/or a device for determining the vehicle orientation is provided, by way of which the driver's current field of view is determined. By way of this device for determining the vehicle orientation or the environment sensor for detecting the vehicle environment in front of the vehicle, the driver's approximate current gaze direction can be determined and it is possible to determine therefrom, in conjunction with the database of topographic information and the database of points of interest or objects of general interest, which points of interest or objects of general interest are presently visible in the driver's field of view. The environment sensor on the vehicle can be embodied in particular as a driver assistance camera, oriented in the direction of travel, which is usually installed in the region of the vehicle's windshield and detects the vehicle environment in the direction of travel of the vehicle.

Thanks to the knowledge of the current driver gaze direction and the knowledge of the points of interest or objects of public interest currently visible in the vehicle environment, it is possible to determine whether the driver is currently looking at a point of interest or is pointing at a point of interest or an object of public interest, and thus whether information pertinent to that object is to be played back. It is also possible that when it is detected that the driver is becoming tired or beginning to doze, the information regarding a currently visible object of public interest or a currently visible point of interest is played back and the driver's fatigue is thereby reduced and traffic safety is enhanced.

In accordance with an example embodiment of the present invention, it is furthermore advantageous that the output device is a display apparatus for outputting images and/or videos, and/or is an audio system by way of which music and/or voice information is outputted. The information regarding the points of interest or the objects of public interest can be videos or texts or images regarding historical circumstances, architecture, urban planning aspects, sports, culture, or points of interest in nature or the landscape. Several different information items of different kinds can be stored for each object.

In accordance with an example embodiment of the present invention, it is furthermore advantageous that the evaluation device outputs, by way of the output device, driver information regarding the points of interest or the object of general interest to which the driver is pointing with his or her finger, to which the driver has directed his or her gaze, or for which the driver has orally requested information from the information system by way of a voice control system. An advantageous embodiment is such that the driver allows his or her gaze or pointed finger to dwell for a minimum time on the object of general interest or the point of interest, so that the desire for an information playback in that regard is recognized. It is furthermore possible, alternatively or in combination, to request output of the information manually by way of driver-actuatable operating elements such as switches or screen input devices (touchscreens).

In accordance with an example embodiment of the present invention, it is additionally advantageous that the driver's gaze direction or the driver's pointing direction which is recognized by way of the device for monitoring the driver is transformed from a vehicle coordinate system into a global coordinate system, and the driver's current field of view (7) is ascertained in consideration of the ascertained current vehicle position and in consideration of the ascertained current vehicle orientation. Because the interior sensor system is vehicle-referred, and the driver's gaze direction or pointing direction can be determined only in terms of the vehicle-referred coordinates, it is particularly advantageous if that gaze direction or pointing direction is converted, with the aid of the ascertained current vehicle position and the ascertained current vehicle orientation, from a vehicle coordinate system into a global coordinate system. As soon as the driver's gaze direction or pointing direction exists in a global coordinate system, i.e., a stationary coordinate system that does not move along with the vehicle or with another movable object, it is relatively simple to ascertain which point of interest or object of general interest is located in the driver's gaze direction, since the pointing direction or gaze direction exists in the same coordinate system as the geo-coordinates of the points of interest or of the objects of general interest.

In accordance with an example embodiment of the present invention, it is furthermore advantageous that output of the information regarding the closest point of interest or closest object of general interest is automatically initiated when the device for monitoring the driver recognizes that the driver is exhibiting signs of fatigue, is showing signs of boredom, is no longer attentively following traffic events, or if the route being traveled is monotonous. It is thereby possible, by way of the system-initiated playback of information, in particular of information that is of interest to the driver, to increase the latter's attentiveness and thereby to contribute to traffic safety. Fatigue or also inattentiveness on the part of the driver can be recognized, for example, by way of an interior camera that images the driver and his or her facial expressions. Alternatively or in combination, the steering angle can also be evaluated, since a driver with signs of fatigue or attentiveness deficits exhibits characteristic steering motions and steering patterns. The indication of boredom can be ascertained, for example, based on the frequency and duration of a gaze that deviates from traffic events. Indications of a monotonous route of travel can be recognized, for example, by way of a video-based or radar-based environment sensor, by recognizing the regularity and duration of recurring patterns such as guardrails.

In accordance with an example embodiment of the present invention, it is furthermore advantageous that several information items, in particular regarding different information categories such as history, culture, architecture, sport, business, or landscape and nature, are stored in the database for each point of interest or each object of public interest, and that a record is kept as to which information has already been played back at an earlier point in time, in order to avoid repetition and to play back information in accordance with a driver preference. If the same route is traveled several times, this makes it possible for different information to be outputted each time as the same point of interest or the same object of general interest is passed, so that the driver receives new and therefore interesting information even when the same point is passed several times, since the same information is not repeated each time the same point is passed by. It is additionally advantageous that preferences are predefinable by the driver as to which information is played back by the output device with respect to a point of interest or an object of general interest, or as to the sequence in which the information with respect to a point of interest or an object of general interest is outputted. Because different information is stored for each point of interest or object of general interest based on categories, for example the categories of historical information, architectural information, sports information, information regarding nature and landscape or information regarding country and people, the driver can indicate his or her preferred information category or can sort a list of the information categories in the sequence of his or her interest, so that upon playback of information only the information in the category of interest to him or her is played back, or in a context of multiple passages the various information items are played back in the sequence of his or her interest.

The example method(s) according to the present invention can be implemented, for example, in software or hardware or in a mixed form of software and hardware, for example in a control device.

The approach presented here furthermore provides a driver information and driver attentiveness system that is embodied to carry out, control, or implement the steps of a variant of the method presented here in corresponding devices.

In accordance with an example embodiment of the present invention, the control system for controlling the playback of driver information or for increasing driver attentiveness can be an electrical device having at least one computation unit for processing signals or data, at least one memory unit for storing signals or data, and at least one interface and/or communication interface for reading in or outputting data that are embedded in a communication protocol. The computation unit can be, for example, a signal processor, a so-called "system ASIC," or a microcontroller for processing sensor signals and outputting data signals as a function of the sensor signals. The memory unit can be, for example, a flash memory, an EPROM, or a magnetic memory unit. The interface can be embodied as a sensor interface for reading in the sensor signals from a sensor and/or as an actuator interface for outputting the data signals and/or control signals to an actuator. The communication interface can be embodied to read in or output the data wirelessly and/or in wire-based fashion. The interfaces can also be software modules that are present, for example, on a microcontroller alongside other software modules.

In accordance with an example embodiment of the present invention, also advantageous is a computer program product or computer program having program code that can be stored on a machine-readable medium or memory medium such as a semiconductor memory, a hard-drive memory, or an optical memory, and is used to carry out, implement, and/or control the steps of the method as recited in one of the embodiments described above, in particular when the program product or program is executed on a computer, a programmable control device, or a similar apparatus.

Be it noted that some of the possible features and advantages of the present invention are described herein with reference to embodiments different from a method for controlling a driver information device. One skilled in the art recognizes that the features can be combined, adapted, or exchanged in suitable fashion in order to arrive at further embodiments of the present invention, in view of the disclosure herein.

BRIEF DESCRIPTION OF THE DRAWINGS

Exemplifying embodiments of the present invention are explained below with reference to the figures.

DETAILED DESCRIPTION OF EXAMPLE EMBODIMENTS

Figure 1:
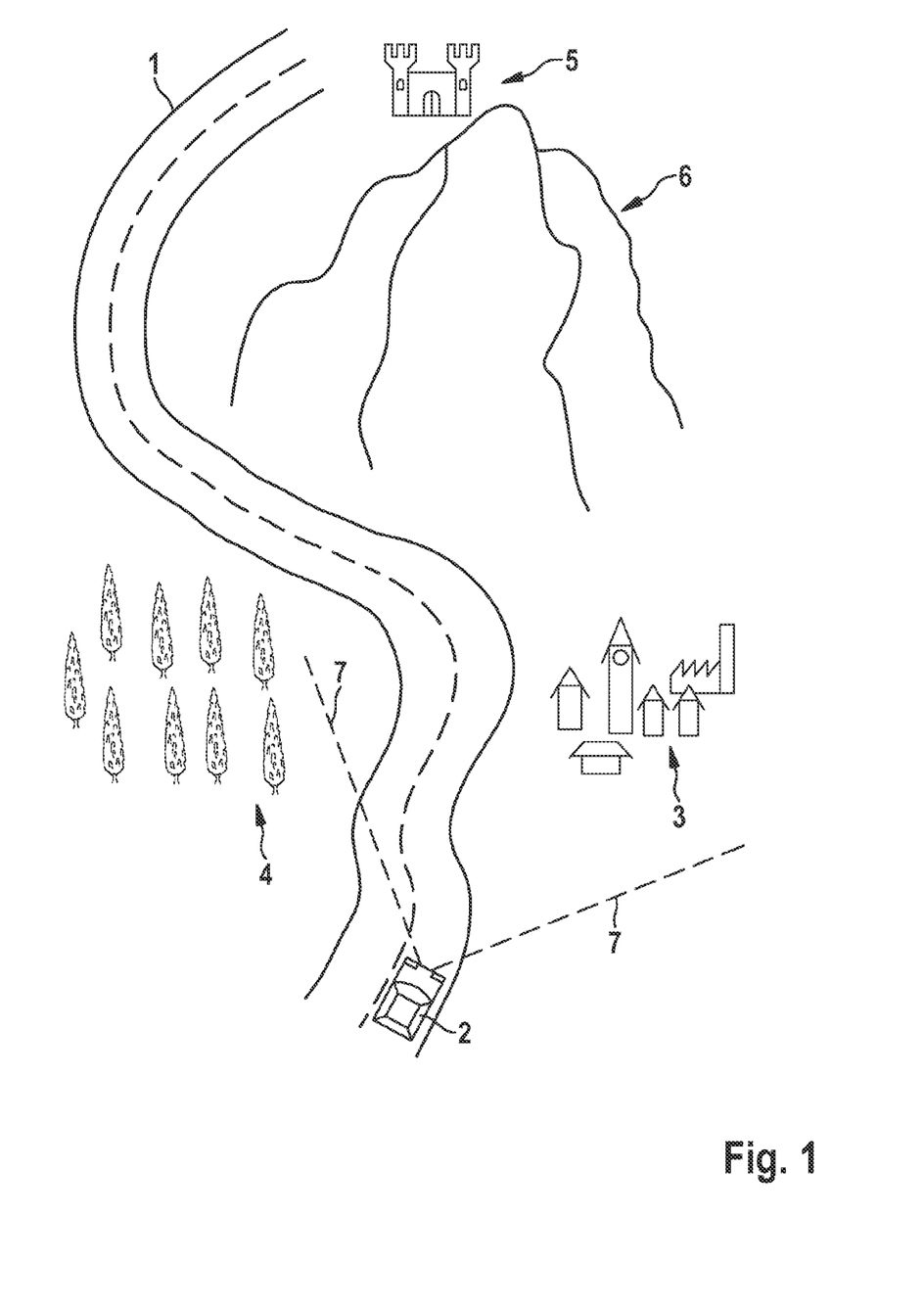
FIG. 1 schematically shows a driving situation to explain an example embodiment of the present invention.

FIG. 1 shows an exemplifying driving situation in which a road 1 is depicted. Vehicle 2 that possesses the system according to the present invention is driving on this road 1. Road 1 furthermore has curves, and only its closer portion is visible to the driver of vehicle 2. Vehicle 2 is a vehicle that possesses an automated or even autonomous driving mode, so that in addition to manual vehicle guidance the driver can also allow the vehicle to drive independently, and in the context of automatic driving can merely perform monitoring tasks or in fact does not need to take on any further driving responsibility at all. An environment sensor, which is installed, e.g., as a camera in the region of the vehicle's windshield, is installed, for example, in vehicle 2. Alternatively, a sensor of a global satellite navigation system could also be used, for example a GPS sensor, which is evaluated together with a gyroscopic sensor and a digital map in order to determine the vehicle's orientation.

While vehicle 2 is driving on road 1, the driver in vehicle 2 is capable of viewing a certain terrain portion. The limits of his or her field of view 7 are drawn in FIG. 1 for that purpose. The environment sensor installed in the vehicle, which can be installed. e.g. as a front camera in the region of the vehicle's windshield, has approximately the same field of view 7. According to the present invention, a determination is made as to which points of interest 3, 4, 5 are present in the driver's field of view 7. Point of interest 3, depicted by way of example as a village, is located in the driver's field of view 7. Object of public interest 4, which is depicted in FIG. 1 by way of example as a point of landscape interest or point of natural interest, is located outside the driver's field of view 7, and would be visible to the driver only if he or she turned his or her head or if, as road 1 continues, the vehicle orientation of vehicle 2 changes in such a way that point of interest 4 comes into the driver's field of view 7. Further point of interest 5, which is depicted by way of example as a historical or architectural point of interest in the form of a castle, is located behind a terrain elevation 6 that is depicted by way of example in FIG. 1 as a mountain. This object of general interest as well, in the form of point of interest 5, would be located within the driver's field of view 7 just like point of interest 3 depicted as a village, but point of interest 5 is not visible to the driver because castle 5 is located behind terrain elevation 6. Only as road 1 continues to be traveled, when vehicle 2 has driven partly around the terrain elevation, will point of interest 5, in the form of the castle that is depicted, become visible. Within this driving situation of FIG. 1 which is depicted by way of example, it is evident that for the driver of vehicle 2, only the object of general interest in the form of village 3 is currently visible in the driver's field of view 7. Point of interest 4 in the form of a landscape object of general interest is not located in the field of view since it is outside field of view 7 because of the viewing angle; and point of interest 5 of architectural or historical interest, in the form of castle 5, is also not visible to the driver in his or her field of view 7 since it is concealed by terrain elevation 6. In accordance with the present invention, the positions of the objects currently visible in field of view 7 is determined with the aid of the positions of points of interest 3, 4, 5 in a database having objects of general interest. The topographic information regarding the surrounding terrain is furnished from the same database or a further database; with this, elevation data are ascertained and with those data a determination is made as to which objects of general interest 3, 4, 5 are not only located in the gaze direction of the driver of vehicle 2, but are also in fact currently visible to him or her based on the terrain topography. Because village 3 is the only object of general interest that is located in field of view 7 of the driver of vehicle 2 and is also currently visible to the driver, information for that object is kept on hand. Several information items can be kept on hand for each of objects 3, 4, 5, for example information regarding historical background, landscape features, sports information, cultural information, or further information categories. This information regarding point of interest 3 that is currently present in field of view 7 is outputted only after a request signal exists; in the context of the information output, preferences can be stipulated by the driver in advance as to which information categories are to be outputted or which categories are to be outputted on a priority basis. This request can be, for example a longer dwell time of the driver's gaze on one of points of interest 3 that is located in the driver's field of view 7, which can be recognized, for instance, by way of an interior camera. Alternatively or in combination, this request can also be recognized by the fact that the driver points for a longer period of time to one of the visible points of interest 3, 4, or requests it verbally by way of a voice input. It is additionally possible for the request signal to be generated automatically by the fact that a driver monitoring device, for example a steering angle monitoring system of the steering column of vehicle 2 or a system for recognizing the face of the driver of vehicle 2, identifies an exceedance of a fatigue threshold, and information regarding point of interest 3 is then played back in the driver's field of view 7 in order to increase driver attentiveness.

Figure 2:
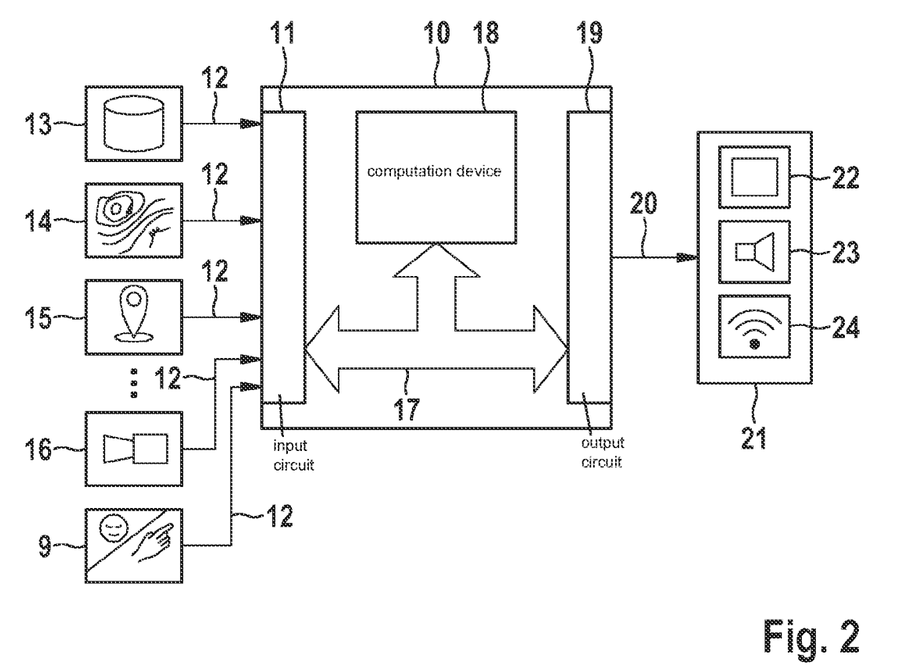
FIG. 2 is a schematic block diagram of an example embodiment of the apparatus according to the present invention.

FIG. 2 is an exemplifying block diagram of an embodiment of the apparatus according to the present invention which can be installed by way of example in vehicle 2. It depicts an evaluation device 10 which possesses an input circuit 11 and by way of which input signals 12 can be made available to evaluation device 10. Suitable input signals 12 are data of a database 13 having information regarding points of interest or objects of general interest 3, 4, 5. In addition to the points of interest, their geographic location, in particular their geographic longitude and latitude, are stored, as well as interesting information with regard to the information categories that are provided. Input signals 12 of a database 14 having topographic information are also delivered to input circuit 11 of evaluation device 10. Database 14 having topographic information encompasses data regarding the terrain profile in the region around vehicle 2, advantageously information that extends as far as the driver's visible horizon. This database 14 regarding topographic information can furthermore contain information with regard to surrounding buildings, for example so that within a large city, a nearby tall building is also available as topographic information. Information of a position determination device 15 which represents the current geographic position of vehicle 2 is delivered to input circuit 11 of evaluation device 10 as a further input signal 12. These position data of position determination device 15 can also, for example, contain the orientation of vehicle 2 in the landscape. Alternatively or in combination, it is furthermore possible to ascertain this from directional information of vehicle 2 in its environment, by way of a further device for determining vehicle orientation 16 which can be, for example, an environment sensor such as a front camera in the region of the windshield of vehicle 2. By way of this environment camera, field of view 7 of vehicle 2 can be determined and can be reconciled with stored image data from a database or a data cloud, and the vehicle orientation in the surroundings can thereby be recognized. These data of environment sensor 16 are delivered to input circuit 11, alternatively or in addition to the orientation information of position determination device 15, as an input signal 12. From the knowledge of the current vehicle position, the current vehicle orientation, and the positions of objects of general interest 3, 4, 5, the current driver field of view 7 can be ascertained. With the addition of the topographic information of database 14, it is possible to filter out those objects of general interest 3, 4, 5 which are located within the driver's field of view 7 but are not currently visible to the driver because of terrain topography or buildings, as was described, e.g., for point of interest 5 in FIG. 1. By way of device 9 for monitoring the driver, it is possible to recognize whether a driver is allowing his or her gaze to dwell for a longer time on a point of interest 3, 4, 5, whether he or she is pointing with his or her finger or hand to a point of interest 3, 4, 5, or whether he or she is exhibiting signs of decreased attentiveness. It is further possible for the driver to request information manually by way of a driver-actuatable operating element such as a push-and-turn positioner or a touch-sensitive display and input device (touchscreen input device). The request signals of device 9 for monitoring the driver are likewise delivered as input signals 12 to input circuit 11 of evaluation device 10. Once input signals 11 have been delivered via a data exchange device 17, which advantageously can be embodied as a bus system, to a computation device 18 that can be embodied, e.g., as a microprocessor or microcontroller, a determination is made in computation device 18 of points of interest 3, 4, 5 that are located within the driver's field of view 7 and are also, based on the terrain elevations, in fact visible to the driver. If a request signal of driver monitoring device 9 is subsequently recognized, information with regard to points of interest 3 currently visible to the driver of vehicle 2 is then outputted. The driver can previously enter preferences as to which kinds of information are to be outputted, for example only sports-related information, or can specify a sequence in which the information categories that are available with respect to the visible object of general interest 3 are to be played back. When a request signal is recognized in calculation device 18, output information is then outputted via data exchange device 17 to output circuit 19 of evaluation device 10, which outputs output signals 20. Output signals 20 can be playback information in the form of images, movies, music, or texts, which are outputted via at least one output device 21. Output signals 20, which for example encompass visual playback information, can play back text or movies by way of a video device 22 that can be, for example, a display device in the center console of the vehicle or in headrests of the front seats. Audible playback information that is outputted as output signals 20 can be outputted in output device 21, for example, as text or music by being delivered to an audio system 23. Additionally or alternatively, it is possible to deliver output signals 20 to playback device 21, which can possess a radio interface 24 that can be embodied, e.g., as a wireless interface for data communication such as a WLAN adapter or Bluetooth adapter, so that the occupants of vehicle 2 can view and/or listen to this information on portable end-user devices such as smartphones or tablet devices.

Figure 3:
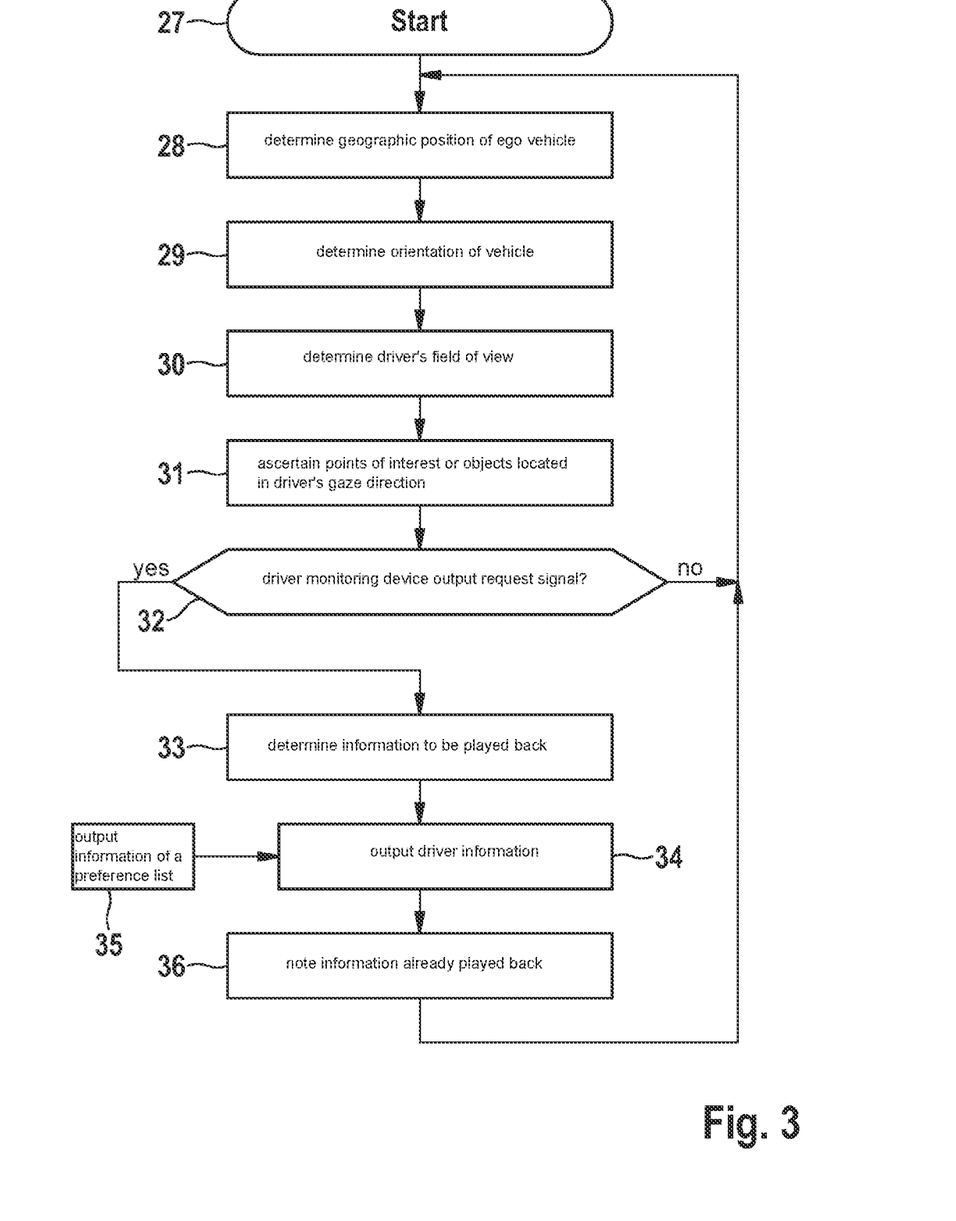
FIG. 3 is a schematic block diagram to explain an example embodiment of the method according to the present invention.

FIG. 3 depicts by way of example a flow chart of a method according to the present invention. It starts with step 27 by the fact that, for example, the vehicle ignition is switched on or an assistance system or infotainment system installed in the vehicle is activated.

In the next step 28, the geographic position of ego vehicle 2 is determined by way of position determination device 15, and is delivered to calculation device 18.

In the next step 29, the orientation of vehicle 2 is determined by the fact that, for example, position determination device 15 can supply information regarding the vehicle orientation, or by the fact that the orientation of vehicle 2 is ascertained via an environment sensor 16 and the terrain features determined therewith.

In the next step 30, the driver's field of view 7 is determined by the fact that the driving direction and the driver's gaze direction are determined from the current vehicle position and the current vehicle orientation. For this, the driver is monitored by way of the interior sensor system and the driver's gaze direction or pointing direction is ascertained. This driver gaze direction or driver pointing direction exists in a vehicle-referred coordinate system, since the interior sensor system is mounted in the vehicle. These coordinates that exist in the vehicle coordinate system are transformed, with the aid of the ascertained current vehicle position and the ascertained current vehicle orientation, into a global coordinate system that does not move along with the vehicle but instead is stationary. From this it is possible to ascertain the driver's current field of view 7 and, from that, also to determine points of interest 3, 4, 5 or objects of general interest 3, 4, 5 that are located in the driver's gaze direction.

The points of interest or objects of general interest 3, 4, 5 that are located in the driver's gaze direction and are additionally visible to the driver are then ascertained in step 31. For this, the information of the database having topographic information 14 is additionally delivered to calculation device 18; and by also incorporating terrain conditions, a determination is made in calculation device 18 as to which points of interest or objects of general interest not only are located in the driver's gaze direction but are also visible within the driver's field of view 7. In FIG. 1, for example, only village 3 is visible within the driver's field of view 7, but not castle 5, which is in the driver's gaze direction but is currently not visible. Natural point of interest 4, on the other hand, is located neither in the driver's field of view 7 nor in the driver's gaze direction.

In the next step 32, a check is made by calculation device 18 as to whether a driver monitoring device 9 has outputted a request signal, for example by the fact that driver fatigue has been identified or the driver has allowed his or her gaze to dwell for a longer time on a point of interest 3, 4, 5 or has pointed with a pointing gesture, for example with a finger or hand or arm, at a point of interest 3, 4, 5 for a longer time. If no request from vehicle monitoring device 9 has been identified, step 32 then branches to No and execution continues in step 28 by redetermining the ego position. If it is identified in step 32 that an information output is necessary because a request has taken place, step 32 then branches to Yes and, in the following step 33, a determination is made of the object of general interest or the selected point of interest 3 with respect to which information is to be played back.

In the next step 34, driver information is outputted by the fact that audiovisual information relating to the point of interest of object of general interest selected in step 33 is played back. The output in step 34 can optionally be delivered as information of a preference list 35 that the driver can specify a priori. This preference list specifies the sequence in which information is to be played back, or specifies which information categories are exclusively to be played back or are not to be played back at all. By way of this preference list 35 the driver can specify that, for example, no sports-related information regarding a football stadium located on road 1 is outputted, or can specify the sequence in which the various information categories are to be played back when the same point of interest 3 or the same object of general interest 3 is repeatedly passed by. If the vehicle travels the same route several times and if driver information regarding a point of interest 3, 4, 5 is requested several times in that context, the category information can be played back in sequence at each pass, so that repetitions of the same information playback can be very largely avoided.

If the output of driver information has been initiated in step 34, the subsequent step 36 then notes in database 13 which information has already been played back, in order to avoid repetitions of the same information playback. After step 36 the method is then looped back again to step 28 by the fact that the ego position is determined and the method is executed again from the beginning.

What is claimed is:

1. An apparatus for controlling an output of driver information to a driver of the vehicle to entertain and/or to increase a driver attentiveness of the driver, comprising:
   a database of points of interest or objects of general interest;
   a database of topographic information;
   a device configured to determine whereabouts of the vehicle;
   an evaluation device to determine, from current whereabouts of the vehicle and from the topographic information, which of the points of interest or objects of general interest are present in a field of view of the driver, wherein input signals are delivered to the evaluation device, data regarding the points of interest or objects of general interest, the topographic data regarding surroundings of the vehicle, and the data regarding whereabouts of the vehicle; and
   an output device to output the driver information regarding one of the points of interest or objects of general interest that have been ascertained by the evaluation device to be located in the field of view of the driver;
   wherein several information items are stored in the database for each of the points of interest or each of the objects of public interest, and a record is kept as to which of the several information items has already been played back at an earlier time to avoid repetition.

2. The apparatus as recited in claim 1, further comprising:
   a device configured to monitor the driver by way of which at least one of the following is detected: a current gaze direction of the driver and/or a facial expression of the driver and/or gestures of the driver and/or a pointing direction of a finger or hand or arm of the driver, and/or data of a device configured for voice recognition and/or an actuation of an operating device by the driver, and a current field of view of the driver is determined.

3. The apparatus as recited in claim 1, further comprising:
   an environment sensor including a driver assistance camera oriented in a direction of travel on the vehicle; and/or
   a device configured to determine an orientation of the vehicle;
   wherein a current field of view of the driver is determined using the environment sensor and/or the device configured to determine the orientation of the vehicle.

4. The apparatus as recited in claim 1, wherein the output device is: (i) a display apparatus configured to output images and/or videos, and/or (ii) an audio system by way of which music and/or voice information is outputted.

5. A method for controlling an output of driver information to a driver of a vehicle, to entertain and/or to increase driver attentiveness of the driver, the method comprising:
   delivering as input signals, to an evaluation device, data regarding points of interest or objects of general interest, topographic data regarding surroundings of the vehicle, and data regarding whereabouts of the vehicle;
   determining, by the evaluation device, from current whereabouts of the vehicle and from the topographic information, which of the points of interest or objects of general interest are present in a field of view of the driver; and
   outputting, by an output device, driver information regarding the points of interest or objects of general interest for which the evaluation device has identified are located in the field of view of the driver;
   wherein several information items are stored in a database for each point of interest or each object of public interest, and a record is kept as to which of the several information items has already been played back at an earlier time to avoid repetition.

6. The method as recited in claim 5, further comprising:
   delivering, to the evaluation device, data of a device configured to monitor the driver, the data of the driving including: data of a driver gaze direction recognition system, and/or data of a driver facial expression recognition system, and/or data of a driver gesture recognition system, and/or data of a system for recognizing the pointing direction of a finger or hand or arm of the driver and/or data of a voice recognition device, and/or data of a driver-actuatable operating device, and/or data of a device for recognizing a posture of a head of the driver;

wherein a current field of view of the driver is determined from the delivered data.

7. The method as recited in claim 5, wherein the evaluation device outputs, by way of the output device, driver information regarding a point of interest or object of general interest: (i) to which the driver is pointing with his or her finger or hand or arm, or (ii) to which a gaze of the driver is directed, or (iii) for which the driver has orally requested information from the information system by way of a voice control system.

8. The method as recited in claim 6, wherein the gaze direction of the driver or the pointing direction, which is recognized by way of the device for monitoring the driver, is transformed from a vehicle coordinate system into a global coordinate system, and the current field of view of the driver is ascertained in consideration of an ascertained current vehicle position and in consideration of an ascertained current vehicle orientation.

9. The method as recited in claim 6, wherein an output of information regarding a closest point of interest or closest object of general interest is automatically initiated when the device for monitoring the driver recognizes that the driver: (i) is exhibiting signs of fatigue, or (ii) is showing signs of boredom, or (iii) is no longer attentively following traffic events, or (iv) exhibits signs of monotony.

10. The method as recited in claim 5, wherein preferences are predefinable by the driver as to which information is played back by the output device with respect to a point of interest or an object of general interest, or as to a sequence in which the information with respect to a point of interest or an object of general interest is output.

* * * * *